Oct. 8, 1940.   W. L. WUEHR   2,217,192
INTERNAL COMBUSTION ENGINE
Filed July 26, 1939   2 Sheets-Sheet 1

Inventor
William L. Wuehr
By Benjamin Webster
Attorney

Oct. 8, 1940.  W. L. WUEHR  2,217,192
INTERNAL COMBUSTION ENGINE
Filed July 26, 1939   2 Sheets-Sheet 2

Inventor
William L. Wuehr
By Benjamin Webster
Attorney

Patented Oct. 8, 1940

2,217,192

UNITED STATES PATENT OFFICE 2,217,192

INTERNAL COMBUSTION ENGINE

William L. Wuehr, Port Arthur, Tex.

Application July 26, 1939, Serial No. 286,604

7 Claims. (Cl. 60—15)

The invention relates to the utilization of the exhaust gases in internal combustion engines, particularly of the "Diesel" type. It has for its main object to provide improved structure and a method for utilizing the heat contained in the exhaust gases, so as to increase the efficiency of the engine by employing the heat contained in these gases to operate a secondary and oppositely-disposed piston so that secondary power impulses will be delivered to the piston rod. Water is sprayed into the secondary piston chamber and converted into steam to augment the power, by mechanism such as is disclosed in my Patent No. 2,057,075, dated Oct. 13, 1936. A further object is to provide a structure and method which may be used in engines of various types and timed to operate in proper relation to such engines.

This application is in part a continuation of my application, Ser. No. 114,230, filed Dec. 4, 1936.

These and various other objects and advantages will be readily understood from the following description and from the accompanying drawings of a preferred embodiment of an engine in which the method can be carried out. However, various modifications may be made in the engine and in the method without varying from the scope of the appended claims. In the drawings Fig. 1 is a cross-sectional side elevation of an engine adapted to carry out the method, the cross-section being taken approximately on the line 1—1 in Fig. 3;

Figure 1:
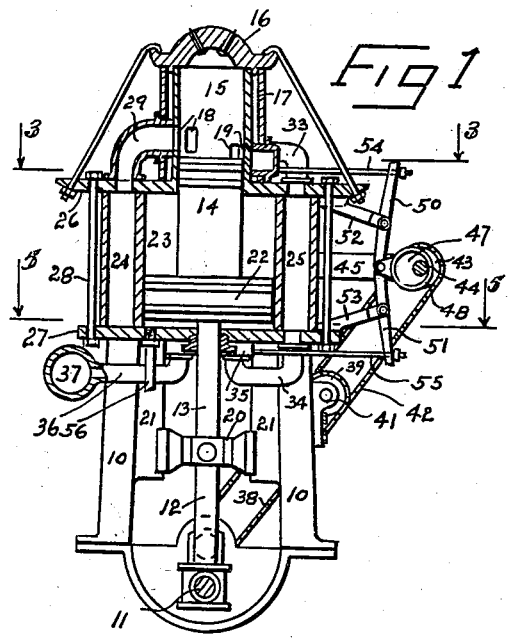
Figure 2:
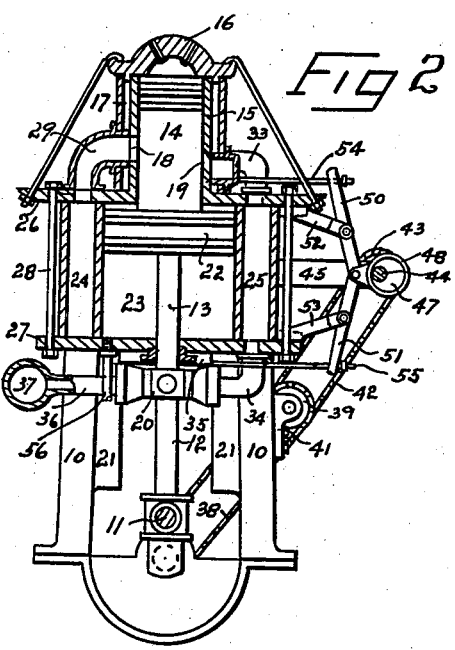
Fig. 2 is a similar view showing the pistons in their upper positions.

To illustrate the invention a "Diesel" engine of the marine type has been selected, however, it is not thereby meant to limit the invention to this or any other particular type of engine. The present invention is a further improvement on Letters Patent No. 2,057,075, granted to me on Oct. 13, 1936. Only such parts as are more or less directly connected with the present invention have been shown, so as to simplify the description of the method.

The engine frame is shown at 10, the crank shaft at 11, the connecting rod at 12, the piston rod at 13, the regular piston at 14, the regular cylinder at 15, the cylinder head at 16, the water jacket at 17, the cylinder exhaust ports at 18, and the scavenging ports at 19. The cross head, which is slidingly mounted on the guides 21, is shown at 20.

To utilize the heat from the exhaust gases another larger and oppositely-disposed piston 22 is secured to the regular piston. This piston works in a cylinder 23 which is constructed with a double wall so as to form a plurality of chambers on the outside of the cylinder. Two of these chambers are shown at 24 and 25 and are utilized as will be explained later. The cylinder is clamped between an upper plate 26 and a lower plate 27 by means of a plurality of tie-bolts 28. To simplify the drawings, these tie-bolts have been omitted on Figs. 3, 4, and 5.

The object of the present invention is to lead the exhaust gases from the cylinder 15 into the cylinder 23 and underneath the piston 22 and to spray in a quantity of water which, due to the heat of the exhaust gases, will be converted into steam and thus drive the large piston 22 upwardly.

Figure 3:
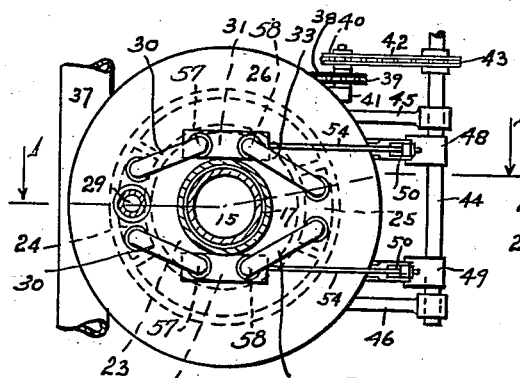
Fig. 3 is a cross-sectional top view taken on the line 3—3 in Fig. 1, but showing certain valve chambers and ducts in full.

This is accomplished in the following manner. As the piston descends the exhaust gases from the cylinder 15 will expand through the ports 18 and into the chamber 24, through the exhaust pipe 29. Referring now to Fig. 3 two ducts 30 are connected with the chamber 24 to slide-valve chambers 31, in which valves 32 are reciprocatingly mounted. One of these valves is shown in detail in Fig. 6 and Fig. 7. The other ends of these valve chambers are connected, by means of ducts 33, to the chamber 25. The valves are operated by a valve mechanism which will be described later.

Figure 4:
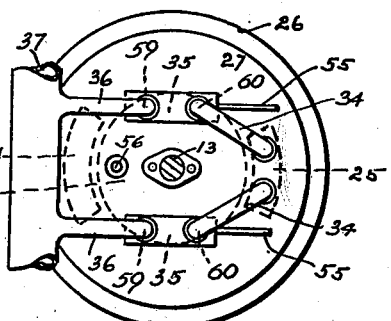
Fig. 4 is a bottom view.

Referring now to Fig. 4, a pair of ducts 34 each leads from the chamber 25 to one end of a pair of slide-valve chambers 35. These valves are constructed similar to the valve just described and shown in Fig. 6 and Fig. 7. The other ends of the valve chambers are connected by a pair of ducts 36 to an exhaust manifold 37. All of the valve chambers are so located as to connect with the large cylinder 23. The exhaust pressure from the chamber 15 is usually approximately 40 lbs. in the average 2-cycle Diesel engine. Normally a scavenging pump is used on this 2-cycle Diesel engine to create suction to eliminate the exhaust gases from the chamber 15. It is one of my aims to eliminate the need for a pump of this kind to assist the scavenging of the exhaust gases and my improved construction shown in my drawings is designed to accomplish this result, because the down stroke of the piston 22 creates suction in the chamber 15, like the suction created by a scavenging pump, and tends to exhaust the gases from the chamber 15 and the chamber 24 into which they have been led on the down stroke of the piston 22. On the contrary, the upward stroke of piston 22 compresses the gases that are in the chamber 23 over the piston 22, which has an area on its upper surface roughly two-thirds of the area on the lower surface. This upstroke drives the exhaust gases and compresses them into chamber 25, which is simply a conduit, and to the bottom of the piston 22, and while the piston 22 is rising the pressure from the top of the piston 22 continues to drive the gases from the chamber 23 thru the chamber 25 to below the piston 22. Simultaneously with the beginning of the upstroke of the piston the hot water valve is opened and introduces hot water of sufficient heat content to form steam of its own accord. In other words the valve 94 is opened and introduces into the chamber below the piston 22 hot water of 350° F. to 375° F. with the exhaust gases under pressure. It has been established and shown by experiments in the 2-cycle Diesel Scott-Still engine that the gases exhausted normally and led to an exhaust hot boiler where 100 lbs. steam was formed and led back from the boiler to the engine piston in order to cool the piston, from the heat gained by contact with the Diesel the pressure was increased to 180 lbs., and when expanded under the same piston (of the same area) a gain of 18% was obtained. My drawings show that I have an area on the lower side of the piston of approximately 50% more than that on the upper side. I obviously gain far more than 18%.

The slide valves are operated in timed relation to the engine by the following mechanism. A sprocket wheel, not shown, is secured on the crank shaft and this sprocket wheel drives a chain 38, which in turn drives a pair of sprockets 39 and 40 supported on a bracket 41, bolted to the frame structure 10. A chain 42 is operated by the sprocket 40 and drives another sprocket 43 secured on a shaft 44 which is mounted on brackets 45 and 46 secured on the outer wall of the large cylinder. Eccentrics 47 are secured on this shaft and their eccentric straps 48 and 49 actuate levers 50 and 51 which are pivoted on brackets 52 and 53. The upper ends of the levers 51 are connected to the valve stems 54 of the upper valves, while the lower ends of the levers 51 are connected to the valve stems 55 of the lower valves.

Figure 6:
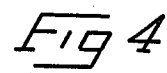
Fig. 6 is a cross-sectional plan view of one of the slide valves employed in the engine.

The method will now be described in detail. As the piston descends, the exhaust gases from the cylinder 15 enter the chamber 24, through the ports 18 and the exhaust pipe 29. From the chamber 24 the gases pass through the ducts 30 and into the slide-valve chambers 31. Ports 57 and 58 lead from these valve chambers to the upper part of the large cylinder 23. The locations of these ports are plainly indicated in Fig. 3 and they are also shown in Fig. 6. The timing of the movements of the slide valves 32 is such that, when the gases enter the slide-valve chambers 31, the ports 57 are open, while the ports 58 are closed by the valves 32. Inasmuch as the ports 57 are open the expanding exhaust gases enter the space in the large cylinder on top of the piston 22.

Figure 7:
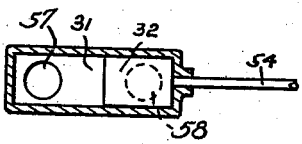
Fig. 7 is a cross-sectional side view of one of the slide-valve chambers.

As shown in Fig. 7, the ports 57 align with the ducts 30, while the ports 58 align with ducts 33, thus as the valves 32 slide back and forth they alternately close the ports 57 and ducts 30, or ports 58 and ducts 33. After the gases have entered the top of the cylinder 23 and by the time the piston reaches the bottom, the valves 32 close the ports 57 and the ducts 30 and open the ports 58 and the ducts 33. As the piston now ascends the gases are passed into the chamber 25, through the ports 58 and ducts 33.

Figure 5:
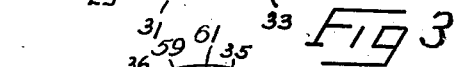
Fig. 5 is a cross-sectional top view taken on the line 5—5 in Fig. 1.

The slide-valve chambers 35, which are located under the large cylinder, are exactly similar to the slide valve chambers 31. From these valve chambers ports 59 and 60 lead to the bottom of the large cylinder, as shown in Fig. 5.

From the chamber 25, the gases are forced into the bottom of the cylinder 23, through the ducts 34 and ports 60, all of which are open, while the ports 59 and ducts 36 are closed by the sliding valves 61. A quantity of water is simultaneously injected into the lower part of the large cylinder by an injector 56. As this water comes in contact with the hot exhaust gases in the cylinder, it is converted into steam which, upon expanding, exerts an upward urge on the large piston.

After the upward stroke is finished, the ducts 34 and ports 60 are closed, while the ducts 36 and ports 59 are opened by the valves 61, so that the steam and gases will be exhausted through these ports and ducts, and through the exhaust manifold 37, when the piston again descends. The water injected into the cylinder is preferably the water used in cooling the engine so that it will already possess a certain amount of heat before being injected.

Figure 8:
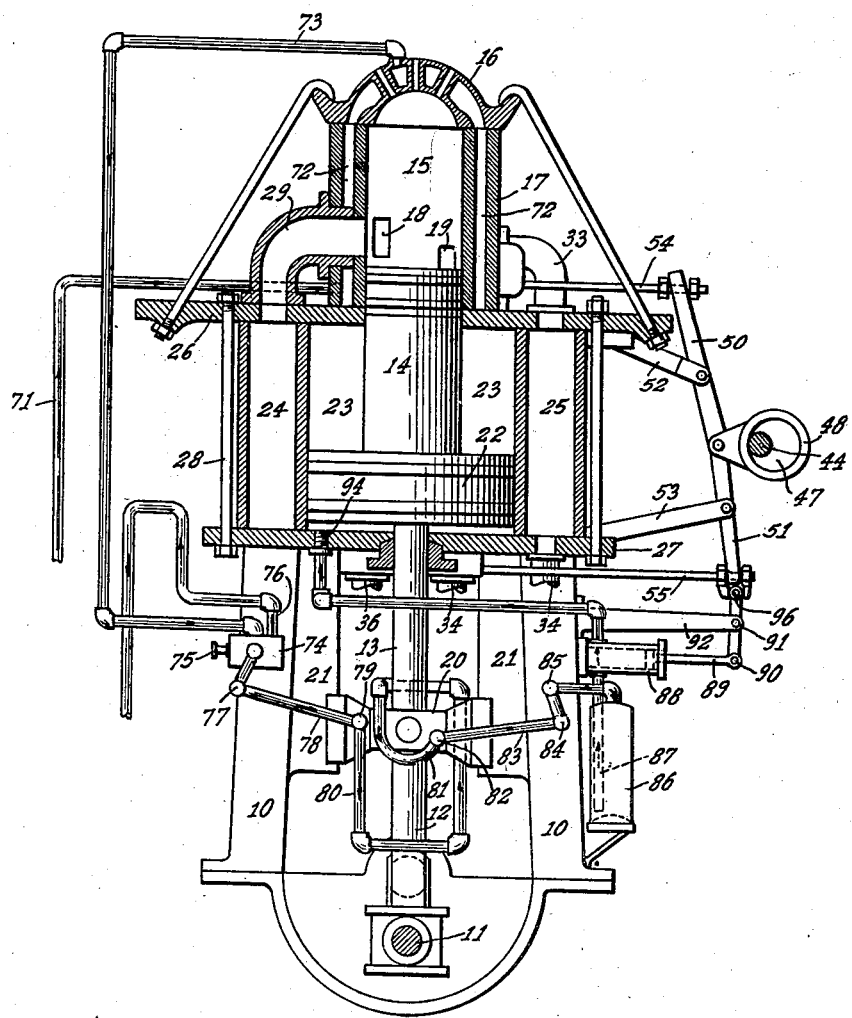
Fig. 8 is a section similar to that of Fig. 1 showing the water circulating and injecting mechanism.

Referring to Fig. 8 there is illustrated a preferred form of circulating system for the water jacket of the Diesel engine. A fresh water inlet pipe 71 connects with the jacket 72 of the combustion chamber. Leading out of the water jacket 72 is a connecting pipe 73 which passes into a filter tank, or hot well 74. A regulating valve 75 positioned on the filter tank 74 gives any desired outlet water temperature by opening or closing this valve. A vent pipe 76 is connected with the filter tank 74 and provides for overflow. A pipe 78 is provided with swivel joints 77 and 79, the joint 79 being secured on the cross-head 20. A pipe 80 from the swivel joint 79 is formed in a coil 81 about the cross-head 20 and by means of another swivel joint 82 connects the pipe 83 through the swivels 84 and 85 with a tank 86. This structure with a Diesel engine having an internal cooling system like that disclosed in my Patent No. 2,057,075, issued Oct. 13, 1936, is efficient. The temperature of the water in the inlet 71 is approximately 130° F. and in the pipe 73 as it enters the filter tank 74, the temperature is approximately 460° F. and in the tank 86 the temperature of the water is approximately 370° F. As this system is designed to be adapted to any and all makes of engines the temperature of this water will vary, of course. From the tank 86 a pipe 87 connects with a pump 88 which is operated by a piston 89 pivoted at 90 on an extension of the arm 51. A pivot pin 91 secures the extension of the arm 51 to the end of a post 92, which is mounted on the side of the engine frame 10. As the pump is operated by the oscillation of the arm 51, which has a pin 93 for operating the valve rod 55, water at a temperature of approximately 370° is forced through spray-valves 94 in the chamber beneath the large piston 22. Since the pump is actuated by the same mechanism which operates the piston valves, the hot gas from the combustion chamber 15 and the water from the spray valve 94 is admitted at the same time. The water can be used over and over as in steam plants.

It will be noted that the hot water used is under high pressure and that therefore there is no space provided for it to vaporize to form steam. Gas under pressure entering the low pressure cylinder together with the simultaneous spraying of hot water into the cylinder under high temperature and at high pressure through fine spray-heads, gives the remarkable new and useful result, providing faster engines, faster moving gases, and therefore high pressures. By bringing the pressure up on what are normally the waste products of a Diesel engine and introducing the hot water at a high temperature and under a high pressure simultaneously there is more benefit than can be derived from the introduction of steam. The hot water injected as described in a very fine spray results in the instantaneous formation of steam. Although the steam may have a relatively high initial pressure, I propose exhausting the Diesel end of the engine a few degrees earlier, thereby obtaining more nearly adiabatic conditions in the Diesel end. Of course these relatively low pressure gases will do more good on the large area low pressure cylinder than on the smaller Diesel end as the area worked on here is much less. This will aid me in reaching my aim, namely equalizing power at top and bottom and making the Diesel double acting with the Diesel's waste products.

It will be noted that I always compress the gases from the Diesel combustion chamber before I expand them. I preferably use a pressure of 500 pounds or more in injecting the water through the spray valve.

Having shown and described a preferred form of my invention and realizing that in view of my disclosure, many changes in detail of construction, materials and arrangement of parts will readily occur to those skilled in the art, I do not limit myself, except as in the appended claims.

I claim:

1. In combination with an internal combustion engine of the reciprocating piston type and including a driving shaft, a high-pressure cylinder, a high-pressure piston, an oppositely disposed low-pressure piston secured to the piston rod end of the high-pressure piston, a cylinder in which said low-pressure piston operates, a chamber adjacent the low-pressure cylinder into which the high-pressure cylinder exhausts, a slide valve operated by the driving shaft for conveying the exhaust gases from the chamber to the upper end of the low-pressure cylinder, a second chamber connected with the upper end of the low-pressure cylinder, a slide valve operated by the driving shaft for conveying these gases thru said second chamber to the lower end of the low-pressure cylinder to supply power to the bottom of the low-pressure piston, means for injecting water in a fine spray into the low-pressure cylinder under the low-pressure piston to mix with the gases, and means for exhausting the expanded gases from the low-pressure cylinder.

2. In combination with an internal combustion engine of the reciprocating piston type having a water-cooling system and including a driving shaft, a high-pressure cylinder, a high-pressure piston, an oppositely disposed low-pressure piston secured to the piston rod end of the high-pressure piston, a cylinder in which said low-pressure piston operates, chambers adjacent the low-pressure cylinder, valves, operated by the drive shaft, for conveying the exhaust gases from the high-pressure cylinder to the upper end of the low-pressure cylinder, valves operated by the drive shaft for conveying these gases thru said chambers to the lower end of the low-pressure cylinder to supply power to the low-pressure piston, means for conveying water from the water-cooling system to the low-pressure cylinder under the low-pressure piston, means for injecting water in a fine spray into the low-pressure cylinder to mix with the gases, and means for exhausting the expanded gases from the low-pressure cylinder.

3. In combination with a water cooled engine of the reciprocating-piston type and including a driving shaft, a high-pressure cylinder, a high-pressure piston, an oppositely disposed low-pressure piston secured to the piston-rod end of the high-pressure piston, a cylinder in which said low-pressure piston operates, a chamber adjacent the low-pressure cylinder into which the high-pressure cylinder exhausts, a valve for conveying the exhaust gases from said chamber to the upper end of the low-pressure cylinder, a second chamber, a valve for conveying these gases thru said second chamber to the lower end of the low-pressure cylinder to supply power to the low-pressure piston, means for forcibly conveying water from the cylinder-cooling system to the low-pressure cylinder under the low-pressure piston, means for atomizing the cooling water before mixing it with the exhaust gases contained in the low-pressure cylinder, and means for exhausting the gases from the low-pressure cylinder.

4. In combination with a water-cooled engine of the reciprocating-piston type and including a driving shaft, a high-pressure cylinder, a high-pressure piston, an oppositely disposed low-pressure piston secured to the piston-rod end of the high-pressure piston, a cylinder in which said low-pressure piston operates, a chamber adjacent the low-pressure cylinder into which the high-pressure cylinder exhausts, a valve for conveying the exhaust gases from said chamber to the upper end of the low-pressure cylinder, a second chamber, a valve for conveying these gases thru said second chamber to the operating end of the low-pressure cylinder to supply power to the low-pressure piston, means for forcibly conveying water from the cylinder cooling system to the bottom of the low-pressure cylinder, said means including a section movable with the cross-head, means for atomizing the cooling water before mixing it with the exhaust gases contained in the low-pressure cylinder, means for timing the admittance of the exhaust gases to the low-pressure cylinder and operated by the driving shaft, and means for exhausting the gases from the low-pressure cylinder.

5. In combination with a water-cooled engine of the reciprocating-piston type and including a driving shaft, a high-pressure cylinder, a high-pressure piston, an oppositely disposed low-pressure piston secured to the piston end of the high-pressure piston, a cylinder in which said low-pressure piston operates, a chamber lying outside and adjacent the low-pressure-piston cylinder into which the high-pressure cylinder exhausts, a valve for conveying the exhaust gases from the chamber to the upper end of the low-pressure cylinder, a second chamber, a valve for conveying these exhaust gases thru said second chamber to the lower end of the low-pressure cylinder to supply power to the low-pressure piston, the aforementioned valves being operated by the driving shaft, means for forcibly conveying water from the cylinder-cooling system into the low-pressure cylinder comprising a pump operated by the driving shaft, a valve in the bottom of said cylinder, means for atomizing the cooling water before mixing it with the exhaust gases contained in the low-pressure cylinder, means for timing the admittance of the exhaust gases to the low-pressure cylinder and actuated by the driving shaft, means for timing the expansion of these gases, and means for exhausting the gases from the low-pressure cylinder.

6. In combination with a water-cooled engine of the reciprocating-piston type and including a driving shaft, a high-pressure cylinder, a high-pressure piston, an oppositely disposed low-pressure piston secured to the piston end of the high-pressure piston, a cylinder in which said low-pressure piston operates, a chamber lying outside and adjacent the low-pressure piston cylinder into which the high-pressure cylinder exhausts, a valve for conveying the exhaust gases from the chamber to the upper end of the low-pressure cylinder, a second chamber, a valve for conveying these exhaust gases thru said second chamber to the lower end of the low-pressure cylinder to supply power to the low-pressure piston, the aforementioned valves being operated by the driving shaft, means for forcibly conveying water from the cylinder-cooling system into the low-pressure cylinder comprising a pump operated by the driving shaft, a valve in the bottom of said cylinder, means for atomizing the cooling water before mixing it with the exhaust gases contained in the low-pressure cylinder, means for timing the admittance of the exhaust gases to the low-pressure cylinder actuated by the driving shaft, means for timing the expansion of these gases, and means for exhausting the gases from the low-pressure cylinder, said water-cooling system including a filter, a section mounted on the crosshead, a tank, and a pump actuated by the driving shaft.

7. In combination with a water-cooled engine of the reciprocating-piston type and including a driving shaft, a high-pressure cylinder, a high-pressure piston, an oppositely disposed low-pressure piston secured to the piston end of the high-pressure piston, a cylinder in which said low-pressure piston operates, a chamber lying outside and adjacent the low-pressure-piston cylinder into which the high-pressure cylinder exhausts, a valve for conveying the exhaust gases from the chamber to the upper end of the low-pressure cylinder, a second chamber, a valve for conveying these exhaust gases thru said second chamber to the lower end of the low-pressure cylinder to supply power to the low-pressure piston, the aforementioned valves being operated by the driving shaft, means for forcibly conveying water from the cylinder-cooling system into the low-pressure cylinder comprising a pump operated by the driving shaft, a valve in the bottom of said cylinder, means for atomizing the cooling water before mixing it with the exhaust gases contained in the low-pressure cylinder, means for timing the admittance of the exhaust gases to the low-pressure cylinder and actuated by the driving shaft, means for timing the expansion of these gases, and means for exhausting the gases from the low-pressure cylinder, the driving shaft operating mechanism, including two levers pivotally connected at one end, rods connected with the other ends of the levers for operating the valves, and a second lever connected with the rod end of one of the two levers and also connected with a shaft that actuates the pump.

WILLIAM L. WUEHR.